(12) United States Patent
Yamamoto

(10) Patent No.: US 7,102,776 B2
(45) Date of Patent: Sep. 5, 2006

(54) FACSIMILE APPARATUS AND CONTROL METHOD FOR CONTROLLING THE SAME

(75) Inventor: Kenji Yamamoto, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 872 days.

(21) Appl. No.: 09/951,870

(22) Filed: Sep. 13, 2001

(65) Prior Publication Data

US 2002/0036797 A1 Mar. 28, 2002

(30) Foreign Application Priority Data

Sep. 25, 2000 (JP) .............................. 2000-290852

(51) Int. Cl.
| | |
|---|---|
| G06K 1/00 | (2006.01) |
| H04N 1/00 | (2006.01) |
| H04N 1/32 | (2006.01) |
| H04N 1/40 | (2006.01) |
| H04M 11/00 | (2006.01) |

(52) U.S. Cl. ................... 358/1.15; 358/1.16; 358/407; 358/440; 358/442; 358/444; 358/437; 379/100.01; 379/100.05; 379/93.24; 379/100.06; 379/100.09

(58) Field of Classification Search ............... 358/1.15, 358/1.16, 403, 407; 379/100.01, 100.08, 379/93.24, 100.09
See application file for complete search history.

(56) References Cited

U.S. PATENT DOCUMENTS 6,301,016 B1 * 10/2001 Matsueda et al. ........... 358/407
6,351,316 B1 * 2/2002 Saito et al. ................ 358/1.15

FOREIGN PATENT DOCUMENTS

| JP | 10-32700 | 2/1998 |
|---|---|---|
| JP | 2001285539 A * | 10/2001 |

* cited by examiner

Primary Examiner—Mark Wallerson
Assistant Examiner—Thomas J Lett
(74) Attorney, Agent, or Firm—Frishauf, Holtz, Goodman & Chick, P.C.

(57) ABSTRACT

In the case where facsimile receiving is carried out while a failure occurs with a printer, a CPU creates a notification E-mail having the received image data attached thereto as a attachment file, and transmits to Internet the created E-mail when an E-mail address registered in a notification destination address area in the information storage is defined as an address.

7 Claims, 5 Drawing Sheets

```
*** This is a forwarded manuscript ***

Forwarding source ID    : Department○○Section××Facsimile
Forwarding source E-mail : abcdef@ghijkl.co.jp
Receiving time          : October 10 (Tue) 2000 10:20 AM
Receiving count         : Five (excluding this page)
Printer state           : No toner Transmission source ID  : Company△△Department▲▲
Transmission source Tel : 9876-54-3210
```

```
* * * This is a forwarded manuscript * * *

Forwarding source ID    : Department○○Section×× Facsimile
Forwarding source Tel   : 0123 - 45 - 6789
Receiving time          : October 10 (Tue) 2000 10 : 20 AM
Receiving count         : Five (excluding this page)
Printer state           : No toner Transmission source ID  : Company△△Department▲▲
Transmission source Tel : 9876 - 54 - 3210
```

FIG. 6

FACSIMILE APPARATUS AND CONTROL METHOD FOR CONTROLLING THE SAME

CROSS-REFERENCE TO RELATED APPLICATIONS

This application is based upon and claims the benefit of priority from the prior Japanese Patent Application No. 2000-290852, filed Sep. 25, 2000, the entire contents of which are incorporated herein by reference.

BACKGROUND OF THE INVENTION

1. Field of the Invention

The present invention relates to a facsimile apparatus that receives image data transmitted via a network, and prints an image indicated by this image data, but carries out memory reception while there occurs a failure such as a state in which printing cannot be carried out; and a control method of such facsimile apparatus.

2. Description of the Related Art

A facsimile apparatus receives transmitted image data, and prints the image data by a printer in real time. Thus, if there occurs a failure such as a state in which no printing paper or no toner is provided, printing cannot be carried out, and thus, facsimile receiving cannot be carried out.

Because of this, some high class machines each are equipped with a large capacity of memory, and comprises a function that stores received data in the memory in the case where a printer fail occurs. This function is called a memory receiving function. According to such a facsimile apparatus, even if a printer fails, facsimile receiving can be carried out.

On the other hand, a failure state may be left as is without a user being aware of a printer failure state. In such a case, even if a memory receiving function is provided, a memory becomes full, and memory receiving cannot be carried out.

In order to solve such a problem, a technique for forwarding image data received while the printer has failed to another facsimile apparatus is disclosed in Jpn. Pat. Appln. KOKAI Publication No. 5-56242, for example.

However, in such a technique, a facsimile apparatus that is a forwarding destination is required in order to forward image data. Thus, in the case where a receiver has only one facsimile apparatus, even if such a facsimile comprises such a function based on the above technique, the above function cannot be used because of the absence of the forwarding destination.

BRIEF SUMMARY OF THE INVENTION

The present invention has been made in order to solve the foregoing problem. It is an object of the present invention to provide a facsimile capable of efficiently carrying out facsimile receiving under various conditions while a printer fails.

According to one aspect of the present invention, there is provided a facsimile apparatus comprising: a receiver configured to receive image data transmitted via a predetermined network; a printer configured to print an image indicated by the image data; an image storage configured to store the image data; a memory receiving processing section configured to store the image data received by the receiving means in the image storage while there occur a failure that the printer cannot carry out printing; an address storage configured to store an E-mail address of a forwarding destination; and a transmission processing section configured to transmit to a predetermined computer network the E-mail having the image data attached thereto as an attachment file while the E-mail address stored in the address storage is defined as an address.

According to another aspect of the present invention, there is provided a control method of a facsimile apparatus that comprises; a printer configured to print an image indicated by image data; an image storage configured to stored the image data, and an address storage configured to store an E-mail address of a forwarding destination, the control method comprising: receiving image data transmitted via a predetermined network; storing in the image storage the image data received when the printer fails to print the image data; and transmitting to a predetermined computer network an E-mail having the image data attached thereto as an attachment file, using the an E-mail address stored in the address storage as an address.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a view showing an example of an image of a data-forwarding notification to be transmitted together with image data during the forwarding of the image data.

DETAILED DESCRIPTION OF THE INVENTION

Hereinafter, one preferred embodiment of the present invention will be described with reference to the accompanying drawings.

Figure 1:
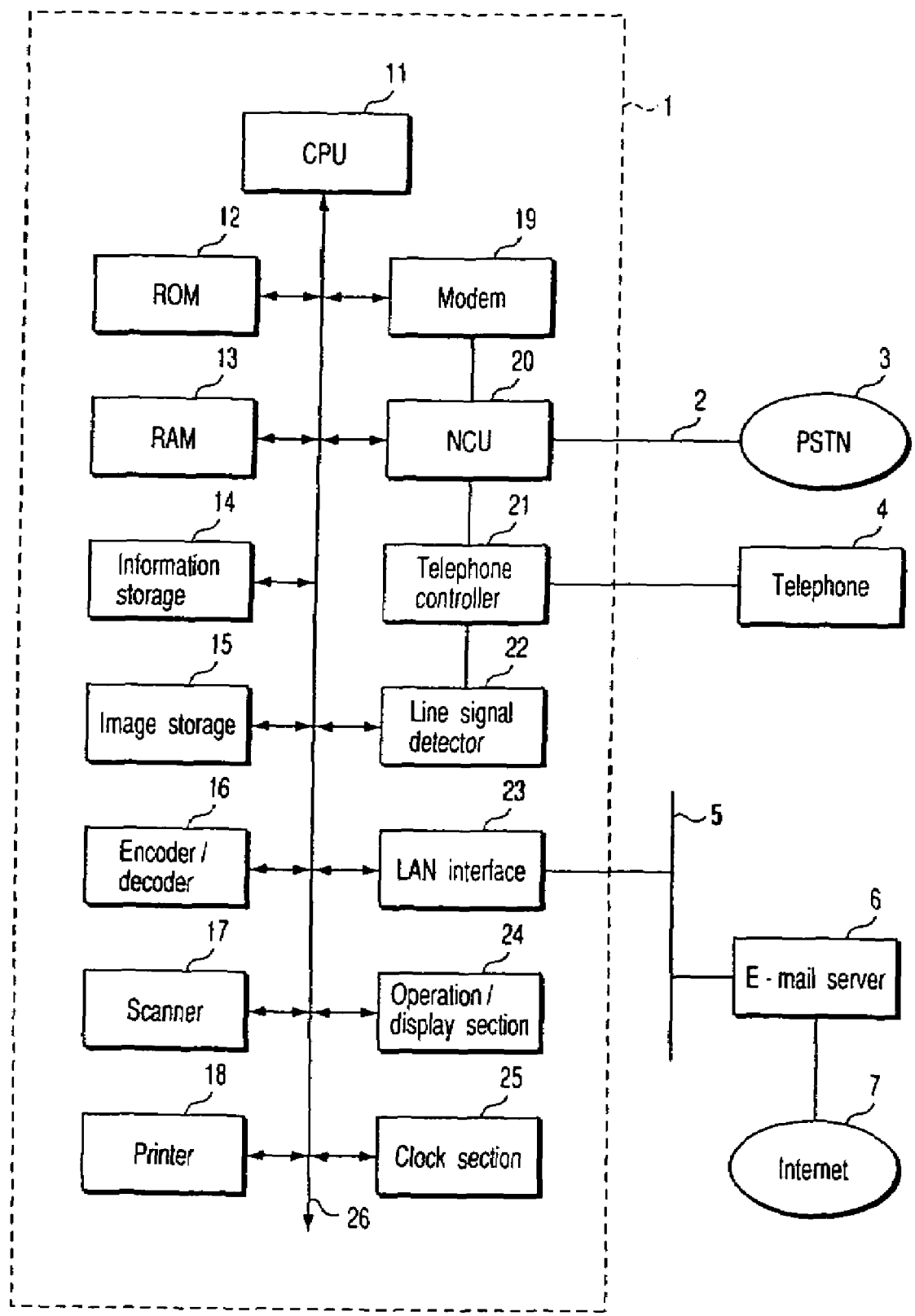
FIG. 1 is a block diagram showing main parts of a facsimile apparatus according to one embodiment of the present invention.

FIG. 1 is a block diagram showing main parts of a facsimile apparatus according to the present embodiment.

In FIG. 1, the facsimile apparatus according to the present embodiment is designated by reference numeral 1. This facsimile apparatus 1 comprises a CPU 11, a ROM 12, a RAM 13, an information storage 14, an image storage 15, an encoder/decoder 16, a scanner 17, a printer 18, a modem 19, an NCU 20, a telephone controller 21, a line signal detector 22, an LAN interface 23, an operation/display section 24, and a clock section 25.

The CPU 11, ROM 12, RAM 13, information storage 14, image storage 15, encoder/decoder 16, scanner 17, printer 18, modem 19, NCU 20, line signal detector 22, LAN interface 23, operation/display section 24, and clock section 25 are connected to each other via a bus 26. In addition, the modem 19 and telephone controller 21 are connected to the NCU 20. Further, the line signal detector 22 is connected to the telephone controller 21.

The CPU 11 executes software processing based on an operating program stored in the ROM 12, thereby controlling each section in order to achieve operation of the facsimile apparatus.

The ROM 12 stores the operation programs and the like.

The RAM 13 is used as a work area and the like for storing various information required for the CPU 11 to carry out various processes.

Figures 2, 5:
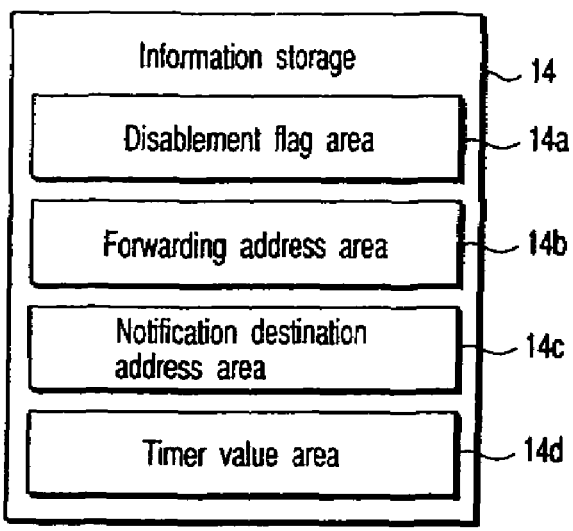
FIG. 2 is a view showing various areas set in an information storage in FIG. 1 in order to store information on conditions concerning a notification/forwarding function.
FIG. 5 is a view showing an example of an image of a data-forwarding notification to be transmitted together with image data during image data notification or the forwarding of the image data.

The information storage 14 uses a flash memory and the like, for example. The information storage 14 stores various setting information and other items of information. A part of the storage area of this information storage 14 is set to a disablement flag area 14a, a forwarding address area 14b, a notification destination address area 14c, and a timer value area 14d, as shown in FIG. 2.

The disablement flag area 14a stores a disablement flag indicating a setting state indicating whether notification/forwarding function is enabled/disabled described later. The forwarding address area 14b stores a telephone number or address of a facsimile apparatus that is a forwarding destination of image data caused by the notification/forwarding function. The notification destination address area 14c stores an E-mail address that is a notification destination of image data caused by the notification/forwarding function. In addition, the timer value area 14d stores the setting of a timer value indicating a wait time for carrying out notification/forwarding by the notification/forwarding function.

The image storage 15 uses a large capacity of DRAM or a hard disk unit and the like, for example. The image storage 15 temporarily stores received image data and image data waiting for transmission.

The encoder/decoder 16 applies encoding processing for compression of the degree of redundancy to image data. The encoder/decoder 16 decodes image data encoded for compression of the degree of redundancy.

The scanner 17 reads out a transmission manuscript, and generates image data that corresponds to such transmission manuscript.

The printer 18 prints an image indicated by image data to printing paper.

The modem 19 modulates image data, thereby generating a facsimile transmission signal or modulates a command assigned from the CPU 11, thereby generating a command transmission signal. The modem 19 delivers these transmission signals to a PSTN subscriber line 2 via the NCU 20. In addition, the incoming facsimile transmission signal or command transmission signal via the PSTN subscriber line 2 is assigned via the NCU 20. The modem 19 modulates a facsimile transmission signal, thereby reproducing image data or modulates a command transmission signal, thereby reproducing a command.

A PSTN 3 is connected to the NCU 20 via the PSTN subscriber line 2. The NCU 20 carries out status supervision concerning the PSTN subscriber line 2 or dispatch processing for the PSTN 3. In addition, the NCU 20 attempts to equalize the facsimile transmission signal delivered from the modem 19 to the PSTN subscriber line 2, and sets an output level of the facsimile transmission signal.

A telephone 4 is connected to the telephone controller 21 as required. The telephone controller 21 carries out well-known control for enabling communication via the PSTN subscriber line 2 by using the connected telephone 4.

To the line signal detector 22, various incoming signals via the PSTN subscriber line 2 is assigned via the NCU 20 and telephone controller 21. The line signal detector 22 supervises this assigned signal, and detects a predetermined incoming signal.

The LAN interface 23 is connected to a LAN 5. In addition, an E-mail sever 6 is connected to the LAN 5. Further, the E-mail server 6 is connected to Internet 7. The LAN interface 23 transmits data via the LAN 5 or Internet 7.

Although not shown, the operation/display section 24 has a key input section and a display section and the like. The key input section uses a number of key switches, for example, and accepts various instructive inputs to the CPU 11 by the user. The display section uses an LCD, for example, and displays various information to be notified to the user under the control of the CPU 11.

The clock section 25 always carries out clocking operation, and outputs a time information that indicates a current time.

In the meantime, the CPU 11 executes software processing based on the operating program stored in the ROM 12 to serve as a memory receiving processing section, a transmission processing section, a forwarding processing section, a selection processing section, and disabling processing section as well as a commonly-know control section in the facsimile apparatus.

The memory receiving processing section causes the image storage 15 to store image data received while there occurs a failure that the printer 18 cannot carry out printing. The transmission processing section creates a notification E-mail in which image data received while the printer 18 fails is attached as an attachment file, and transmits a specified notification destination address as an address. The forwarding processing section forwards to a specified forwarding address the image data received while the printer 18 fails via general facsimile transmission via PSTN 3 or via Internet facsimile transmission via Internet 7. The selection processing section selects whether or not to carry out notification caused by the transmission processing section or forwarding caused by the forwarding processing section based on the user setting. The disabling processing section disables processing caused by the transmission processing section and forwarding processing section is disabled when the notification/forwarding function is disabled. The notification/forwarding function used here denotes a function that carries out transmission of a notification E-mail by the transmission processing section or forward of image data by the forwarding processing section.

Now, an operation of the thus configured facsimile apparatus will be described here. A description is given by focusing on an operation concerning the notification/forwarding function characterized by the present invention.

Figure 3:
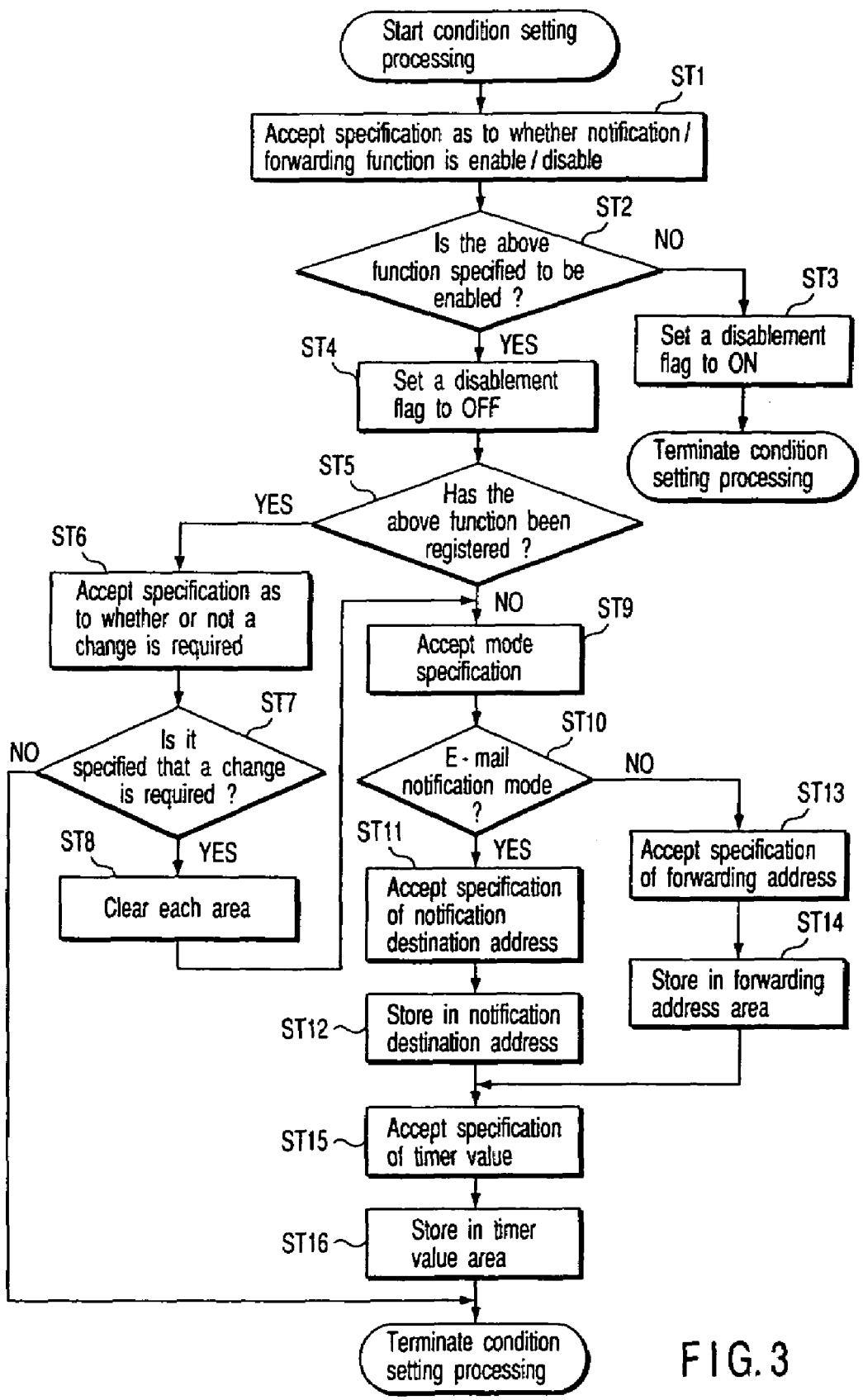
FIG. 3 is a flow chart of a condition setting process.

First, if it is required to carry out condition setting concerning the notification/forwarding function by a predetermined instructive operation by the user at the operation/display section 24, the CPU 11 executes condition setting processing as shown in FIG. 3.

In this condition setting processing, the CPU 11 first accept the user specification as to whether the notification/forwarding function is enabled or disabled (step ST1), and checks whether or not the function is enabled is specified by the user (step ST2).

If the CPU 11 checks that notification/forwarding function is specified to be disabled, the CPU 11 sets to ON the disablement flag set in a disablement flag area 14a (step ST3). In this case, the CPU 11 terminates condition setting processing without carrying out setting processing of another condition.

In contrast, if the CPU 11 checks that notification/forwarding function is specified to be enabled, the CPU 11 sets to OFF the disablement flag set to the disablement flag area 14a (step ST4).

Then, the CPU 11 checks whether conditions each concerning the notification/forwarding function have been registered or not (step ST5). If the conditions each concerning the notification/forwarding function have been registered, the CPU accepts the user specification as to whether or not to change the registered conditions (step ST6), and checks whether or not making such change has been specified by the user (step ST7). That is, the CPU 11 checks whether or not condition change may be made. If the CPU 11 checks that no change has been specified by the user, the CPU 11 terminates condition setting processing. However, if the CPU has checked that such change has been specified by the user, the CPU 11 clears information stored in a respective one of the forwarding address area 14b, notification address area 14c, and timer value area 14d (step ST8).

In the case where it is checked at the step ST5 that conditions each concerning the notification/forwarding function are not registered or in the case where such each condition is cleared at the step ST8, the CPU 11 then accepts the user specification as to which of the notification mode and forwarding mode described later is enabled (step ST9), and checks whether or not the notification mode has been selected (step ST10).

When it is checked that the notification mode has been selected, the CPU 11 accepts the user specification of an E-mail address of the notification destination (step ST11), and stores in the notification destination address area 14c this specified E-mail address being a notification destination address (step ST12).

In contrast, when it is checked that the forwarding mode has been selected, the CPU 11 accepts specification of a forwarding address (step ST13), and stores this specified forwarding address in the forwarding address area 14b (step ST14). The forwarding mode makes it possible to carry out forward through general facsimile communication via PSTN 3 and forward through Internet facsimile transmission via Internet 7. If forward through general facsimile communication is desired, the user specifies a telephone number for making a call for a facsimile apparatus that is a forwarding destination as a forwarding address. In addition, if forward through Internet facsimile communication is desired, the user specifies an address assigned for dispatch to the facsimile apparatus that is a forwarding destination as a forwarding address.

In this way, if the user specifies the notification mode, only the notification destination address is registered to the information storage 14. And if the user specifies the forwarding mode, only the forwarding address is registered to the information storage 14.

In this way, after the notification destination address or forwarding address has been registered, the CPU 11 accepts the user specification of a timer value (step ST15), and stores the specified timer value in the timer value area 14d (step ST16). Then, upon the completion of registration of the timer value, the CPU 11 terminates condition setting processing.

As has been described above, registration of the disablement flag, notification destination address or forwarding address, and timer value according to the user specification is made.

Figure 4:
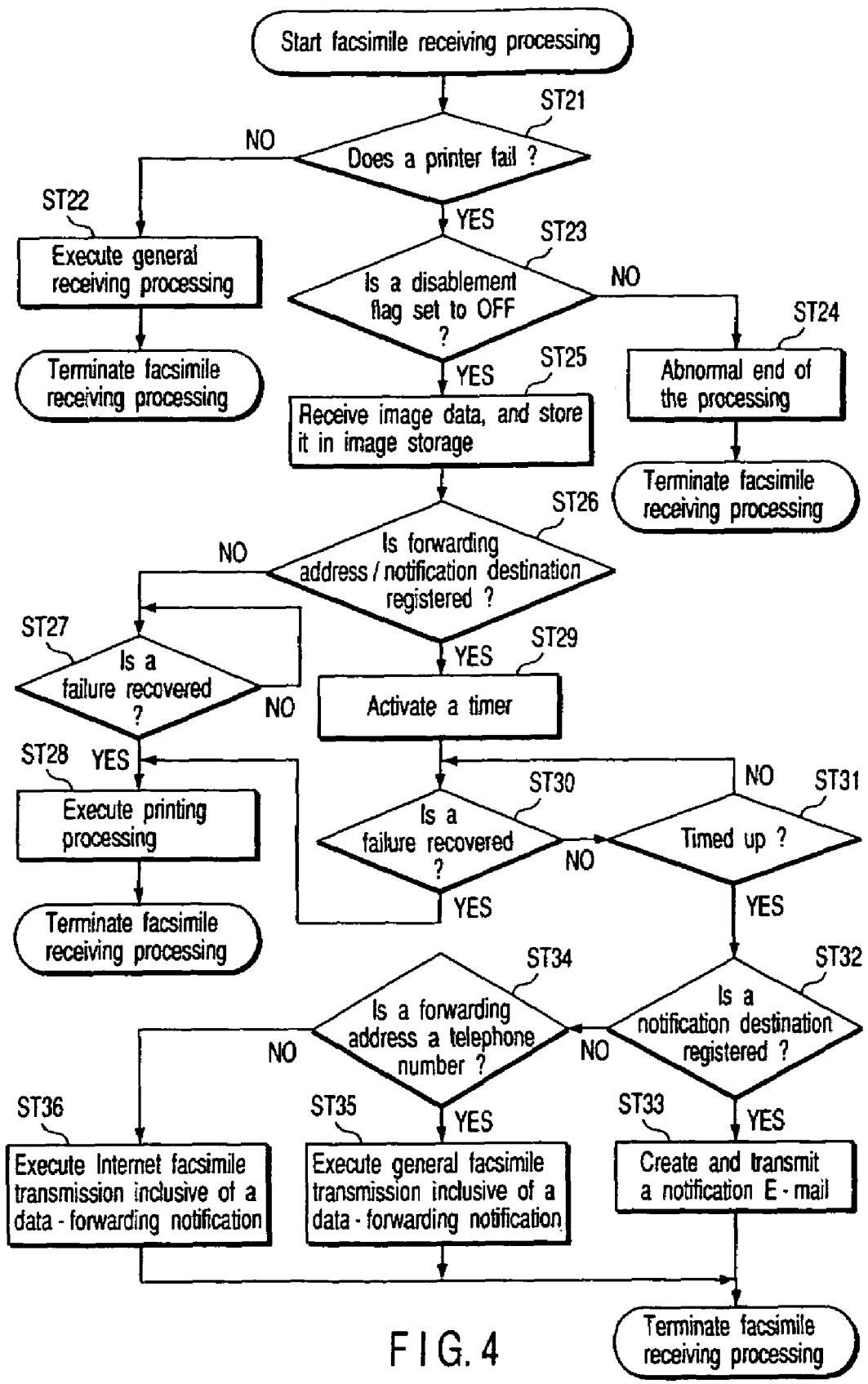
FIG. 4 is a flow chart of a facsimile receiving processing.

If there occurs a need to carry out facsimile receiving, the CPU 11 executes facsimile receiving processing as shown in FIG. 4.

In this facsimile receiving processing, the CPU 11 checks whether or not the printer 18 fails (step ST21). Then, when it is checked that the printer 18 does not fail, the CPU 11 executes general receiving processing (step ST22). Upon the completion of this receiving processing, facsimile receiving processing is terminated. The general receiving processing used here denotes a processing for receiving the incoming image data via the PSTN 3, for example, by means of the NCU 20 and modem 19, and carrying out printing by the printer 18 in real time based on the image data every time a predetermined amount (for example, one page) of image data has been received while temporarily storing the received image in the image storage 15.

On the other hand, if it is checked that the printer 18 fails, the CPU 11 then checks whether or not the disablement flag is set to OFF (step ST23). If the disablement flag is set to ON, the notification/forwarding function is set to be disabled by the user. Thus, the CPU 11 carries out general abnormal end of the processing (step ST24) without carrying out processing of the step ST25 or later for achieving the notification/forwarding function, and terminates facsimile receiving processing. The abnormal end of the processing used here denotes processing for terminating communication as impossible receiving, for example.

In contrast, if it is checked at the step ST23 that the disablement flag is set to OFF, the notification/forwarding function is set to be enabled by the user. Thus, the CPU 11 carries out processing described later by using the transmission processing section, selection processing section, or forwarding processing section, and provides the notification/forwarding function. The CPU 11 disables processing caused by the transmission processing section or forwarding processing section as required by processing at the step ST23. The processing at the step ST23 is done by the disabling processing section.

That is, if it is checked at the step ST23 that the disablement flag is set to OFF, the CPU 11 receives image data transmitted via the PSTN 3 or Internet 7, and stores all of the received image data in the image storage 15 (step ST25).

Then, the CPU 11 checks whether or not either the forwarding address or the notification destination address is registered in the information storage 14 (step ST26). If none of the forwarding address and notification destination address is registered, even if the notification/forwarding function is set to be enabled, the notification/forwarding function cannot be carried out. In this case, the CPU 11 waits until a failure with the printer 18 is eliminated (step ST27), if such failure has been eliminated, the CPU causes the printer 18 to carry out printing based on the image data stored in the image storage 15 (step ST28). Then, the CPU 11 terminates facsimile receiving processing upon the completion of this printing.

In contrast, if it is checked that either the forwarding address or the notification destination address is correctly registered, the CPU 11 activates a timer for counting the timer value stored in the timer value area 14d (step ST29). This timer is provided by processing of another routine of the CPU 11.

The CPU 11 then waits until a failure with the printer 18 is eliminated or until the timer has timed out (step ST30 and step ST31). If it is checked that the failure with the printer 18 has been eliminated earlier than when the timer has timed up, the CPU 11 goes to the step ST28 at which printing is carried out, and then, facsimile receiving processing is terminated.

However, if it is checked that the timer has timed up without the failure with the printer 18 having been eliminated, the CPU 11 checks whether or not a notification address is registered in the notification destination address area 14c (step ST32). If it is checked that the notification address is registered, the CPU 11 creates a notification E-mail, and transmits the created E-mail from the LAN interface 23 to Internet 7 via the LAN 5 and E-mail server 6 (step ST33). When transmission of the notification E-mail has completed, the CPU 11 terminates facsimile receiving processing.

The notification E-mail used here is such that information concerning this facsimile receiving assumes that an image data file containing the received image data is attached as an attachment file to an E-mail main body shown in FIG. 5, for example. Although data transmitted through Internet facsimile communication as well is configured in the same way, the notification E-mail used here conforms to a general E-mail mode without conforming to an Internet facsimile format. Further, a file format of an image data file is such that an Internet terminal generally develops. Therefore, in this case, the notification destination may be a general-purpose Internet terminal instead of a facsimile apparatus.

In contrast, in the case where it is checked at the step ST32 that a notification destination address is not registered, that is, in the case where the forwarding address is registered in the forwarding address area 14b, the CPU 11 checks whether the thus registered forwarding address is a telephone number (step ST34). If it is checked that such telephone number is registered as a forwarding address, the CPU 11 transmits the received image data inclusive of an image of data-forwarding notification as shown in FIG. 6, for example through general facsimile communication via the PSTN 3 (step ST35). In this manner, the received image data is forwarded to another facsimile apparatus by using general facsimile communication. If general facsimile transmission has completed, the CPU 11 terminates facsimile receiving processing.

On the other hand, if it is checked at the step ST34 that no telephone number is registered as a forwarding address, that is, if an address is registered, the CPU 11 transmits the received image data inclusive of an image of a data-forwarding notification as shown in FIG. 5, for example, through Internet facsimile communication via Internet 7 (step ST36). In this manner, the received image data is forwarded to another facsimile apparatus by using Internet facsimile communication. When Internet facsimile communication has completed, the CPU 11 terminates facsimile receiving processing.

As has been described above, according to the present embodiment, the received image is notified by E-mail transmission via Internet 7, thus making it possible to forward the received image data addressed to an Internet terminal other than a facsimile apparatus. In this manner, any Internet terminal capable of receiving E-mail such as personal computer or portable telephone terminal can be defined as an image data forwarding destination, thus making it possible to efficiently forwarding an image under a wide condition.

Further, in the present embodiment, it is possible to carry out facsimile forwarding whose address is a general facsimile apparatus that makes facsimile communication via a PSTN 3 or Internet facsimile device that makes facsimile communication via Internet 7. Thus, more flexible image forwarding can be achieved.

In the present embodiment, the user can arbitrarily set whether the notification/forwarding function is enabled or disabled. When the function is set to be disabled, image data is not forwarded by any method. This makes it possible to disable image forwarding if unnecessary.

The present invention is not limited to the above embodiment. For example, in the above embodiment, a file format of an image data file attached to a notification E-mail is fixed. However, processing in accordance with plural type of file formats is enabled, thereby making it possible for the user to arbitrarily select an available file format. Doing this makes it possible to send image data in a proper file format according to an Internet terminal that is a notification destination, which is very convenient.

In addition, in the above embodiment, in the case where the notification/forwarding function is set to be disabled, although the disablement flag is set to ON so as not to carry out facsimile receiving while the printer 18 fails, the conventional memory receiving may be carried out even if the notification/forwarding function is set to be disabled.

In the above embodiment, either one of the forwarding address and notification destination address is registered in either one of the forwarding address area 14b and notification destination address area 14c, and the user selected forwarding scheme is judged based on which of the forwarding address and notification destination address is registered. That is, the forwarding address area 14b and notification destination address area 14c are used as a means for storing a forwarding scheme. However, a specific area is provided as a means for storing a forwarding scheme so that the user selected forwarding scheme may be directly registered.

In the above embodiment, there is exemplified a facsimile apparatus capable of carrying out both of general facsimile communication via PSTN 3 and general facsimile communication via Internet 7. However, the present invention is applicable to a facsimile apparatus capable of either of them as well.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A facsimile apparatus comprising:
   a receiver configured to receive image data transmitted via a network;
   a printer configured to print an image indicated by the image data;
   an image storage configured to store the image data;
   a memory receiving processing section configured to store the image data received by the receiver in the image storage when a failure occurs such that the printer cannot carry out printing;
   an address storage configured to store an E-mail address;
   a timer configured count an elapsed time after the image data is stored in the image storage;
   a control section configured to cause the printer to print the image indicated by the image data stored in the image storage, if the printer becomes able to carry out printing before the timer reaches a time-out timer value; and a transmission processing section configured to transmit to a computer network an E-mail having the image data attached thereto as an attachment file using the E-mail address stored in the address storage as a destination address, if the timer reaches the time-out timer value before the printer becomes able to carry out printing.

2. A facsimile apparatus according to claim 1, further comprising:

a call information storage configured to store call information for calling a facsimile apparatus that is a forwarding destination;

a forwarding processing section configured to facsimile-transmit the image data stored in the image storage by using the call information stored in the call information storage;

a forwarding scheme storage configured to store data set by the user to enable one of the transmission processing section and the forwarding processing section; and a forwarding scheme selecting section configured to selectively operate the one of the transmission processing section and the forwarding processing section enabled by the user in accordance with the data stored in the forwarding scheme storage, when the image data is stored in the image storage by the memory receiving processing section.

3. A facsimile apparatus according to claim 1, further comprising:

an enable/disable storage configured to store data set by user to specify whether to forward the received image data; and a disabling processing section configured to disable an operation of the transmission processing section when the data stored in the enable/disable storage indicates that image data should not be forwarded.

4. A facsimile apparatus according to claim 1, wherein the transmission processing section adds data indicating a state of the printer to the E-mail.

5. A facsimile apparatus according to claim 2, further comprising:

an enable/disable storage configured to store data set by user to specify whether to forward the received image data; and a disabling processing section configured to disable an operation of the transmission processing section and the forwarding processing section when the data stored in the enable/disable storage indicates that image data should not be forwarded.

6. A facsimile apparatus according to claim 2, wherein the forwarding processing section transmits an image of data-forwarding notification, which indicates a state of the printer, along with the image data stored in the image storage.

7. A method of controlling a facsimile apparatus that comprises: a printer configured to print an image indicated by image data; an image storage configured to store the image data, and an address storage configured to store an E-mail address, said method comprising:

receiving image data transmitted via a network;

storing the received image data in the image storage when the printer fails to print the image data;

counting an elapsed time after the image data is stored in the image storage;

causing the printer to print the image indicated by the image data stored in the image storage, if the printer becomes able to carry out printing before the elapsed time reaches a time-out timer value; and transmitting to a computer network an E-mail having the image data attached thereto as an attachment file, using the E-mail address stored in the address storage as a destination address, if the elapsed time reaches the time-out timer value before the printer becomes able to carry out printing.

* * * * *